United States Patent
Lee et al.

(10) Patent No.: US 6,351,491 B1
(45) Date of Patent: Feb. 26, 2002

(54) APPARATUS AND METHOD FOR OPTIMIZING THE RATE CONTROL FOR MULTISCALE ENTROPY ENCODING

(75) Inventors: Hung-Ju Lee, Santa Clara, CA (US); Tihao Chiang, Taipei (TW); Iraj Sodagar, La Jolla, CA (US); Ya-Qin Zhang, West Windsor, NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 09/594,401

(22) Filed: Jun. 15, 2000

Related U.S. Application Data
(60) Provisional application No. 60/140,545, filed on Jun. 23, 1999.

(51) Int. Cl.[7] .................................................. H04B 1/66
(52) U.S. Cl. .................. 375/240.03; 382/251; 382/252; 382/239; 382/240; 382/248
(58) Field of Search .............................. 375/240, 240.03; 348/397, 398, 399, 405, 419; 382/251, 252, 239, 240, 248, 232, 245, 246

(56) References Cited

U.S. PATENT DOCUMENTS

| | | | |
|---|---|---|---|
| 5,333,012 A | 7/1994 | Singhal et al. .............. 348/405 |
| 5,528,238 A | 6/1996 | Nickerson .................... 341/67 |
| 5,606,371 A | 2/1997 | Gunnewiek et al. ........ 348/405 |
| 5,764,805 A | 6/1998 | Martucci et al. ............ 382/238 |
| 5,790,196 A | 8/1998 | Sun et al. .................... 348/419 |
| 6,023,296 A | * 2/2000 | Lee et al. .................... 348/405 |
| 6,049,630 A | * 4/2000 | Wang et al. ................. 348/398 |
| 6,055,017 A | * 4/2000 | Shen et al. .................. 348/398 |
| 6,167,087 A | * 12/2000 | Kato ........................ 375/240.03 |

OTHER PUBLICATIONS

Xiong Z. et al: "Joint Optimization of Scalar and Tree–Structured Quantization of Wavelet Image Decompositions", Proceedings of the Asilomar Conference, US, NY, IEEE, Nov. 1, 1993, pp. 891–895, XP0004348424, sections 2–3.1.

Cheng P–Y. et al.: "Video coding using embedded wavelet packet transform and motion compensation", Visual Information Processing V, Orlando, FL, USA, Apr. 9, 1996; vol. 2753, pp. 64–75, XP000933680, Proceedings of the SPIE—The International Society for Optical Engineering, 1996, SPIE–Int. Soc. Opt. Eng. USA ISSN: 0277–786X, Sections 1,2.2, Figure 4.

Sodagar I. et al.: "Scalable Wavelet Coding for Synthetic/Natural Hybrid Images", IEEE Transactions on Circuits and Systems for Video Technology, US, IEEE Inc. New York, vol. 9, No. 2, Mar. 1999, pp. 244–254, XP000805529, ISSN: 1051–8215, Sections II.A–C, Figure 9.

\* cited by examiner

*Primary Examiner*—Chris Kelley
*Assistant Examiner*—Shawn S. An
(74) *Attorney, Agent, or Firm*—William J. Burke

(57) ABSTRACT

A method and apparatus for recursively optimizing the rate control of a hierarchical subband coding system that offers spatial, quality and/or complexity scalabilities. The rate control method recursively adjusts the quantizer scale for each layer of a subband tree, i.e., a subband decomposed image.

20 Claims, 6 Drawing Sheets

APPARATUS AND METHOD FOR OPTIMIZING THE RATE CONTROL FOR MULTISCALE ENTROPY ENCODING

This application claims the benefit of U.S. Provisional Application No. 60/140,545 filed Jun. 23, 1999, which is herein incorporated by reference.

The present invention relates to an apparatus and concomitant method for optimizing the coding of an image sequence, e.g., motion video. More particularly, this invention relates to a method and apparatus that recursively optimizes the rate control, e.g., adjusting the quantizer scale, for each layer of a hierarchical subband coding system, e.g., a wavelet transform based coding system.

BACKGROUND OF THE DISCLOSURE

International committees have established various standards for coding/decoding strategies. Examples of such standards include, but are not limited to, the Moving Picture Experts Group Standards (e.g., MPEG-1 (11172-*), MPEG-2 (13818-*) and MPEG-4 (14496-*)), H.261 and H.263. Although the present invention is described below in terms of an MPEG encoding system, it should be noted that the present invention can be adapted to other encoding systems that are compliant to other standards.

Although the MPEG standards specify a general coding methodology and syntax for generating an MPEG compliant bitstream, many variations are permitted to accommodate a plurality of different applications and services such as desktop video publishing, video conferencing, digital storage media and television broadcast. In the area of rate control, MPEG does not define a specific method for controlling the bit rate of an encoder. It is the task of the encoder designer to devise a rate control process for controlling the bit rate such that the decoder input buffer neither overflows nor underflows.

Examples of rate controls for encoding systems are disclosed in U.S. patent application Ser. No. 08/738,228 filed Oct. 24, 1996 and Ser. No. 09/022,349 filed Feb. 11, 1998, which are commonly owned by the Assignee and are herein incorporated by reference. These encoding systems employ rate control methods that compute quantization scale or quantizer scale in accordance with a complexity model having a polynomial form. These rate control methods have been found to be very effective.

However, as new encoding systems are developed or functionalities are added, the rate control methods may have to be adapted or refined. For example, wavelet transforms, otherwise known broadly as an example of a hierarchical subband decomposition, have recently been used for low bit rate image compression because such decomposition leads to a hierarchical multi-scale representation of the source image. The hierarchical multi-scale representation provides a flexible platform for implementing various innovative processing methods.

For example, U.S. Pat. No. 5,412,741 issued May 2, 1995 and herein incorporated by reference discloses an apparatus and method for encoding information with a high degree of compression. The apparatus uses zerotree coding of wavelet coefficients in a much more efficient manner than any previous techniques. The methods as discussed in the '741 patent are known as the "Embedded Zerotree Wavelet" (EZW) method.

Another example is the concept of "multiscale zerotree entropy encoding" (MZTE) which is the subject of U.S. patent application Ser. No. 09/107,544, filed Jun. 30, 1998 which is commonly owned by the Assignee and is herein incorporated by reference. MZTE extends the zerotree entropy (ZTE) encoding method to achieve a fully scalable coding method by implementing a multiscale zerotree coding method. Both ZTE and MZTE coding techniques use the concept of zerotree symbol to achieve the compression gain. Each quantized wavelet coefficient in a wavelet tree is assigned with one of the four symbols: zerotree root (ZTR), valued zerotree root (VZTR), value (VAL) or isolated zero (IZ). A zerotree root denotes a coefficient that is the root of a zerotree. Zerotrees do not need to be scanned further because it is known that all coefficients in such a tree have amplitudes of zero. A valued zerotree root is a node where the coefficient has nonzero amplitude, and all four children are zerotree roots. A VAL symbol identifies a coefficient with a value, either zero or non-zero, but also with some descendant somewhere further along the tree that has a non-zero value. An IZ symbol identifies a coefficient with zero value, but with some descendant somewhere further along with a nonzero.

The MZTE technology has been adopted by the MPEG-4 committee as the Visual Texture Coding tool (VTC) for compression of natural and synthetic images. The VTC coding technique provides useful functionality such as spatial and quality scalabilities, error resilience, and selective region of interests with better image quality. However, without an efficient and effective rate control method, multimedia applications using the MPEG-4 VTC may be limited.

Therefore, there is a need in the art for a method and apparatus that recursively optimizes the rate control, e.g., adjusting the quantizer scale, for each layer of a hierarchical subband coding system that offers spatial, quality and/or complexity scalabilities.

SUMMARY OF THE INVENTION

In one embodiment of the present invention, a method and apparatus is disclosed that recursively optimizes the rate control, e.g., adjusting the quantizer scale, for each layer of a hierarchical subband coding system that offers spatial, quality and/or complexity scalabilities. The present invention recursively adjusts each quantization scale of a subband layer in accordance with a weighting factor that prioritizes the importance among the subband or resolution layers.

More specifically, the quantization scale for each subband layer can be recursively adjusted in accordance with a quantization error that is computed from at least two of said plurality of subband layers. Thus, the selection of the quantization scale for each subband layer accounts for the dependency that exists between coefficients of different subband layers. In one embodiment, the measure of the quantization error is a mean square quantization error (MSE), where the weighting factor is determined by the MSE of the next iteration in each individual subband layer. With this newly computed MSE, the weighting factor can be used to forward predict and heuristically reduce the overall MSE for the entire frame.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention is a method and apparatus that recursively optimizes the rate control, e.g., adjusting the quantizer scale, for each layer of a hierarchical subband coding system that may offer spatial, quality and/or complexity scalabilities. Specifically, the present rate control invention is capable of addressing the dependency that is inherent in hierarchical subband coding system. Although the present invention is described below in terms of wavelet decomposition, it should be understood that the present invention is not so limited, and can be broadly adapted to hierarchical subband decomposition in general. Namely, wavelet is a particular type of subband decomposition.

In an ZTE wavelet-based coding system, dependencies exist among zerotree symbols and wavelet layers. A quantization parameter selected for one wavelet layer will interact with other wavelet layers. An effective rate control invention must properly address this dependency criticality.

Figure 4:
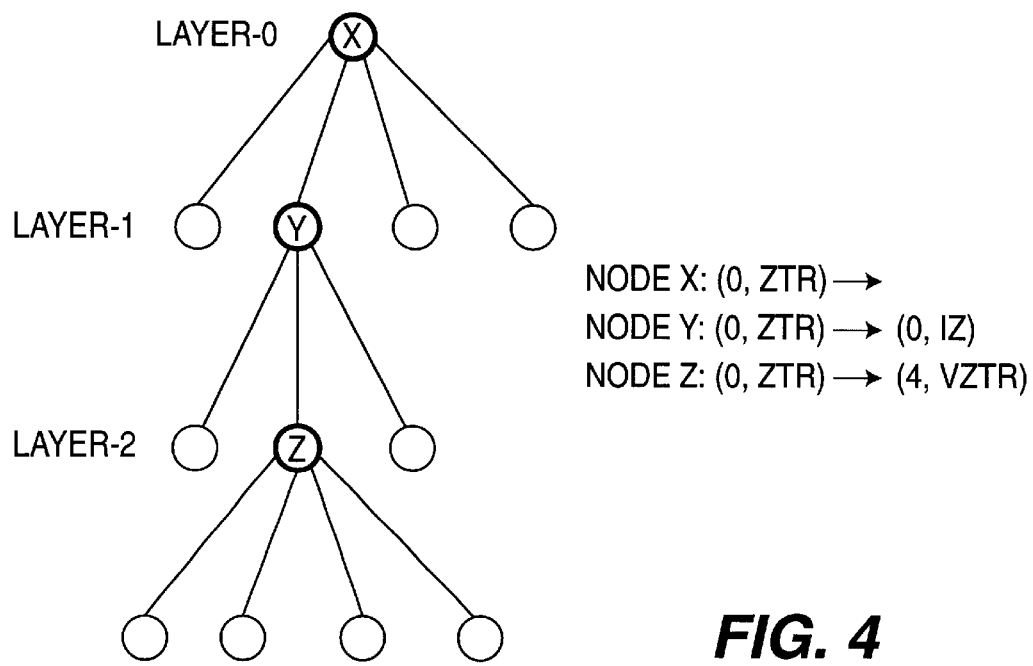
FIG. 4 is a schematic illustration of the dependency of zerotree based coding.

To illustrate, FIG. 4 is a schematic illustration of the dependency of zerotree based coding. In ZTE, each quantized wavelet coefficient is assigned one of four zerotree symbols: ZTR, VZTR, VAL and IZ. Assuming an image is decomposed into four wavelet decomposition layers, layer-0, layer-1, layer-2 and layer-3, where layer 0 is the coarsest layer (i.e., closest to the DC layer) and layer 3 is the finest layer. Let Q0, Q1, Q2 and Q3 be the quantization parameters or scales for layer-0, -1, -2, and -3 respectively. Then the change of Q2 value may affect the zerotree symbol assignment of nodes in layer-1 and layer-0. Similarly, the change of Q1 value may affect the zerotree symbol assignment of nodes in layer-0, but not layer-2. FIG. 4 illustrates such a scenario where without loss of generality, assuming that at iteration i, all of nodes X in layer-0, Y in layer-1 and Z in layer-2 are quantized to 0 with zerotree symbol ZTRs. At the next iteration i+1, Q2 decreases so that node Z is quantized to non-zero value (i.e., 4 in this case), then node Z is marked as VZTR, then node Y will be marked as IZ since one of its children is not zero. Similarly, node X is marked as IZ. From the above scenario, it becomes clear that the quantization parameter change in a lower layer affects the bitrate used in its upper layer since the statistics of zerotree symbols are changed. The present rate control invention is capable of addressing such dependency.

Figure 1:
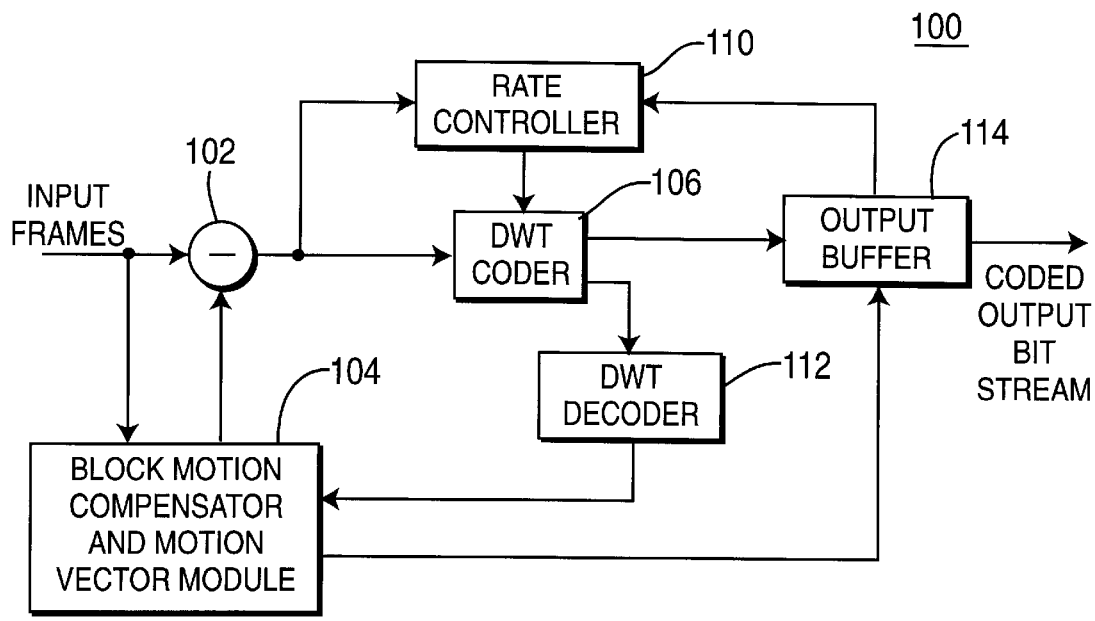
FIG. 1 depicts a block diagram of a hierarchical subband encoding system, e.g., a wavelet-based encoding system, incorporating the present invention.

To better understand the present invention, a description is now provided of the hierarchical subband coding system in which the present rate control method is deployed. FIG. 1 depicts an encoder or portion of an encoding system 100 of the present invention. The encoder 100 contains a block motion compensator (BMC) and motion vector module 104, a subtractor 102, a hierarchical subband coder, e.g., a discrete wavelet transform (DWT) coder 106, a bit rate controller 110, a DWT decoder 112 and an output buffer 114. It should be noted that the terms "coder" and "encoder" are used interchangeably in the specification.

In general, the input signal is an image (a two-dimensional array of pixels (pels) defining a frame in an image sequence). To accurately transmit the image through a channel, the spatial and temporal redundancy in the image frame sequence must be substantially reduced. This is generally accomplished by coding and transmitting only the differences between successive frames. In brief, the encoder 100 performs three broad functions: first, it produces a plurality of motion vectors that represent motion that occurs between frames; second, it predicts the present frame using a reconstructed version of the previous frame combined with the motion vectors; and third, the predicted frame is subtracted from the present frame to produce a frame of residuals that are coded and transmitted along with the motion vectors to a receiver. Within the receiver, a decoder reconstructs each video frame using the coded residuals and motion vectors. It should be noted that certain anchor frames, e.g., I frames, may be coded without performing motion estimation.

Figure 2:
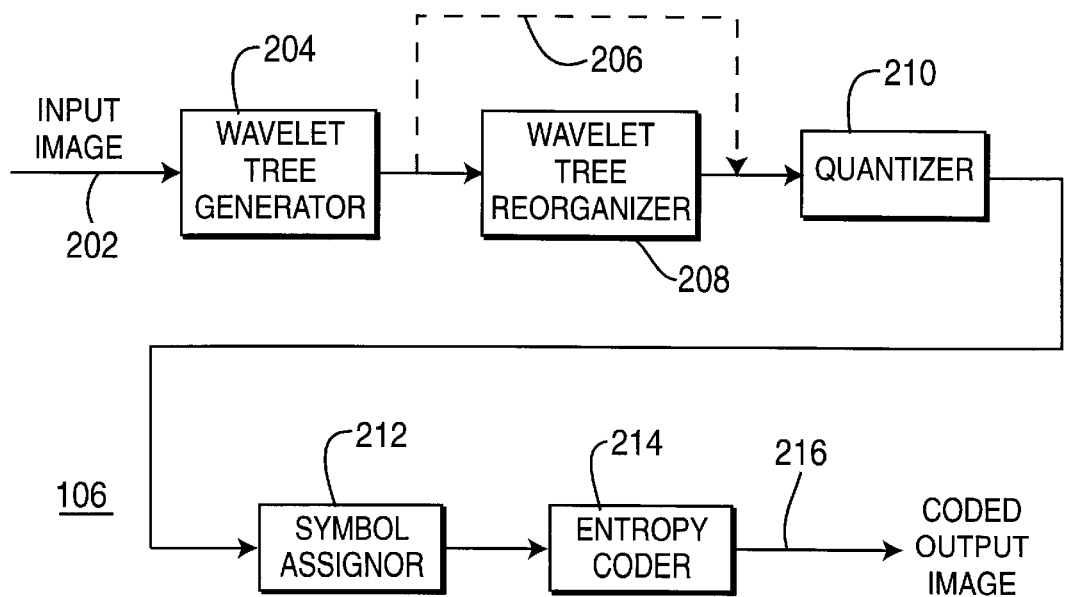
FIG. 2 depicts a block diagram of a hierarchical subband encoder, e.g., a wavelet-based encoder of the present invention.

More specifically, FIG. 2 depicts a block diagram of the encoder 106 of the present invention. The encoder 106 contains a wavelet tree generator 204, an optional wavelet tree reorganizer 208, a quantizer 210, a symbol assignor 212, and an entropy encoder 214. Each of these components is connected in series to process an image at port 202 into a coded output image at port 216. The input image is typically a pixelated (digitized) photographic image as can be produced from an image scanner or a computer graphics system. However, the input image can also be a frame within a series of frames of video images or a motion compensated residual frame produced by a video encoding system. In general, the invention processes any form of digitized image or portion thereof, i.e., any form of two-dimensional data.

Figure 3:
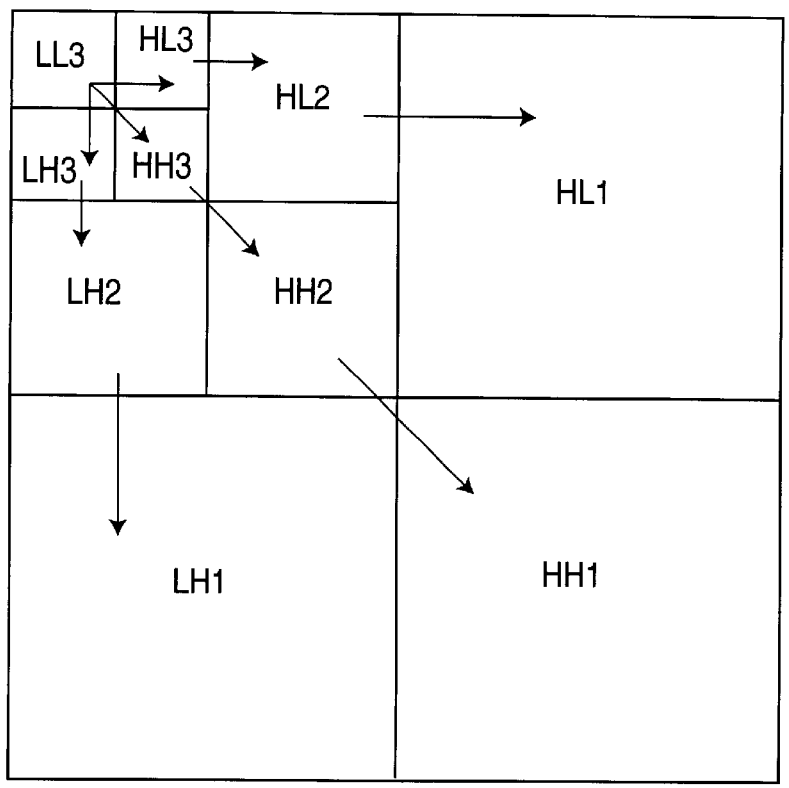
FIG. 3 is a graphical representation of a wavelet tree.

The wavelet tree generator 204 performs a wavelet hierarchical subband decomposition to produce a conventional wavelet tree representation of the input image. To accomplish such image decomposition, the image is decomposed using times two subsampling in each of two-dimensions into high horizontal-high vertical (HH), high horizontal-low vertical (HL), low horizontal-high vertical (LH), and low horizontal-low vertical (LL), frequency subbands. The LL subband is then further subsampled times two in each of two dimensions to produce a set of HH, HL, LH and LL subbands. This subsampling is accomplished recursively to produce an array of subbands such as that illustrated in FIG. 3 where three subsamplings have been used. Preferably four or more subsamplings are used in practice, but the present invention can be adapted to any number of subsamplings. The parent-child dependencies between subbands are illustrated as arrows pointing from the subband of the parent nodes to the subbands of the child nodes. The lowest frequency subband is the top left $LL_3$, and the highest frequency subband is at the bottom right $HH_1$. In this example, all child nodes have one parent. A detailed discussion of subband decomposition is presented in J. M. Shapiro, "Embedded Image Coding Using Zerotrees of Wavelet Coefficients", IEEE Trans. on Signal Processing, Vol. 41, No. 12, pp. 3445–62, December 1993.

Returning to FIG. 2, the quantizer 210 quantizes the coefficients of the wavelet tree via path 206 in a "depth-first" pattern. Namely, the method traverses each tree from the root in the low-low subband ($LL_3$) through the children. Although the foregoing description of the depth-first scanning pattern was discussed as a "top down" pattern, a depth-first scanning pattern also includes scanning from the bottom up. As such, the quantization can also be accomplished by starting at a tree's "leaves" (the bottom-most nodes) and proceeding up the tree. Once that tree was complete, the quantization process would quantize another tree, and another, and so on until all the nodes in all the trees were quantized. As shall be discussed below, the quantization scale selected for each layer will be recursively adjusted to optimize the rate control.

After quantization, at each node of the tree, the quantized coefficient has either a zero value or a non-zero value. The quantized coefficients of the wavelet tree are efficiently encoded by again scanning each tree. Thus, symbol assignor 212 operates by traversing the tree and assigning particular symbols to each node depending upon the node's quantized value as well as the quantized values of each node's descendants.

In turn, the symbols and values are encoded using an entropy coder 214, such as a conventional arithmetic coder. Although the encoder 106 is described as comprising various elements, those skilled in the art will realize that these elements or the functions performed by these elements can be implemented within or without the encoder 106, e.g., outside of the encoder 106, but within the encoding system 100 of FIG. 1.

In the present invention, the above ZTE method is adapted to encode wavelet trees to generate bitstreams with flexible degrees of spatial, quality and complexity scalabilities. More specifically, FIGS. 5–7 illustrate three different examples of bitstreams having different scalabilities.

Figure 5:
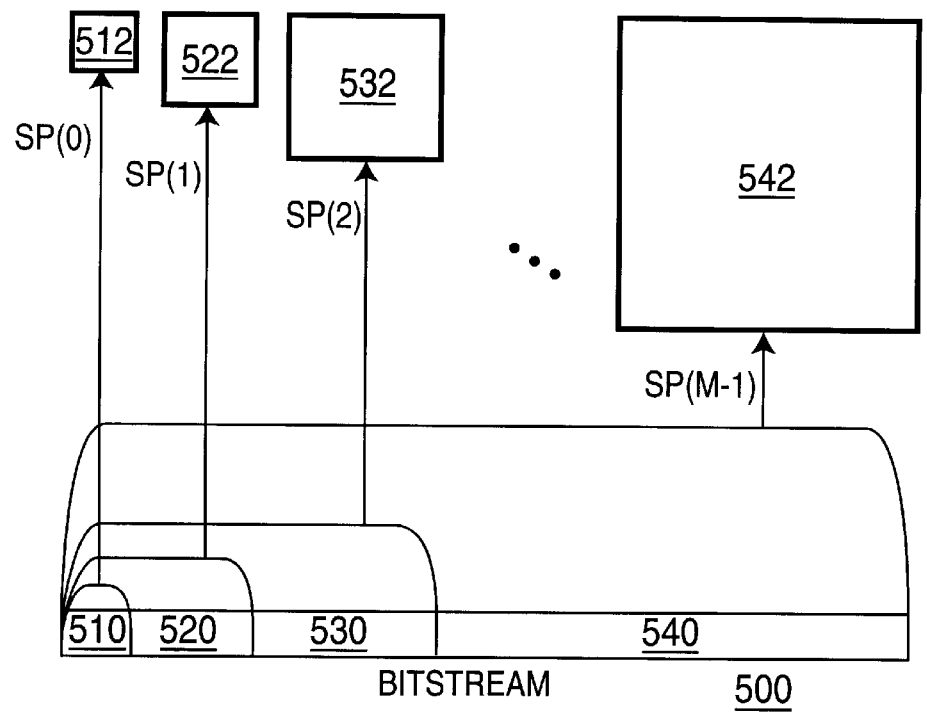
FIG. 5 depicts a block diagram of a bitstream with layers of spatial resolution scalability.

FIG. 5 illustrates a block diagram of a bitstream 500 with M layers of spatial resolution scalability. Namely, the bitstream is constructed such that the information representing spatial resolutions 512–542 of an input image corresponds to different portions 510–540 of the bitstream 500. In this fashion, if a decoder needs to obtain a spatial resolution 512 of the input image, then the decoder simply decodes the corresponding portion 510 of the bitstream. Thus, if a decoder needs to obtain higher spatial resolutions of the input image, the decoder simply decodes the relevant portions of the bitstream as needed.

Figure 6:
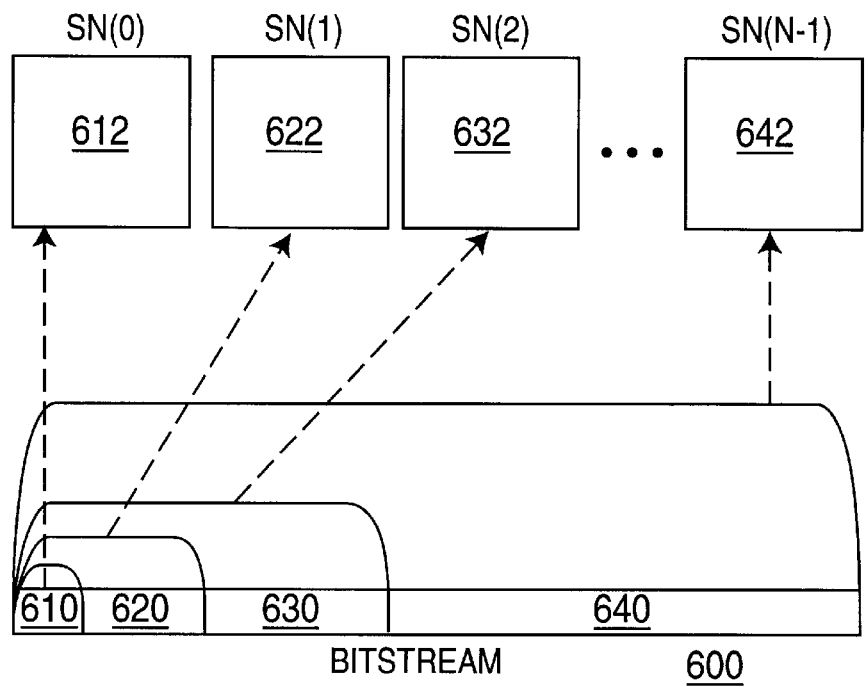
FIG. 6 depicts a block diagram of a bitstream with layers of SNR or quality scalability.

FIG. 6 illustrates a block diagram of a bitstream 600 with N layers of SNR or quality scalability. Namely, the bitstream is constructed such that the information representing different qualities 612–642 of an input image corresponds to different portions 610–640 of the bitstream 600. In this fashion, if a decoder needs to obtain a particular quality 612 of the input image, then the decoder simply decodes the corresponding portion 610 of the bitstream. Thus, if a decoder needs to obtain higher qualities of the input image, the decoder simply decodes the relevant portions of the bitstream as needed.

Figure 7:
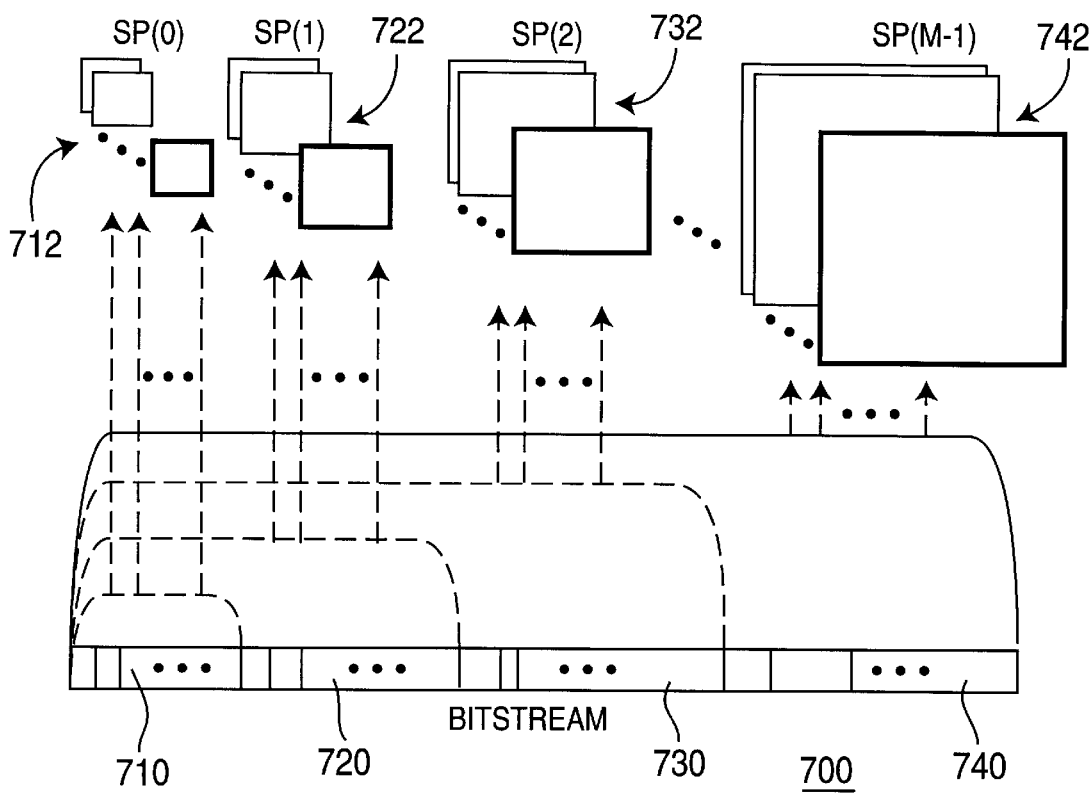
FIG. 7 depicts a block diagram of a bitstream with combined SNR-spatial scalabilities.

Finally, in FIG. 7, the bitstream 700 has M layers of spatial resolution and N layers of SNR scalability, i.e., combined SNR-spatial scalabilities. Namely, the bitstream is constructed such that the information representing different combined SNR-spatial scalabilities 712–742 of an input image corresponds to different portions 710–740 of the bitstream 700. In this fashion, if a decoder needs to obtain a particular combination of SNR-spatial scalability 712 of the input image, then the decoder simply decodes the corresponding portion 710 of the bitstream. The number and the kind of scalability (SNR, spatial) are described in the bitstream by the encoder.

Figure 8:
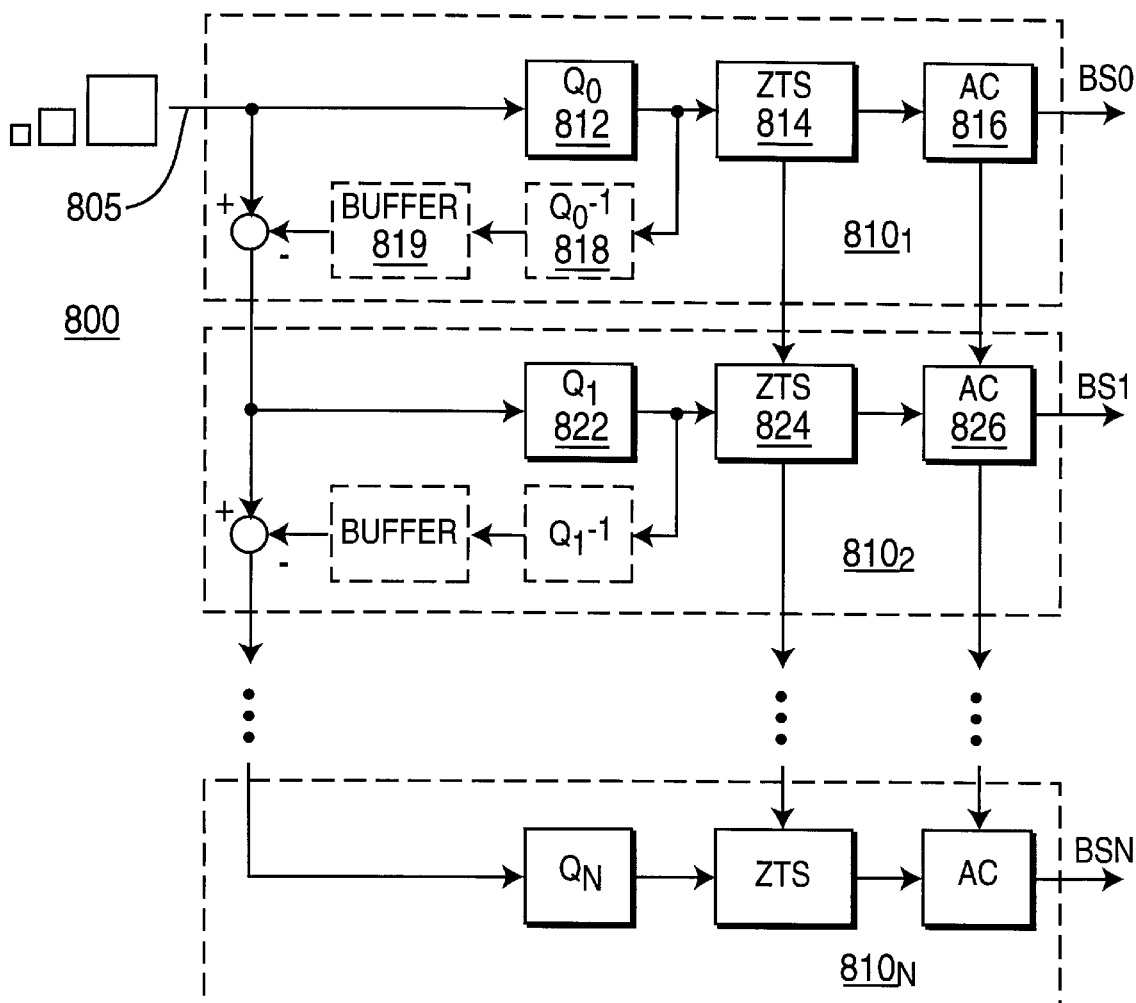
FIG. 8 illustrates a block diagram of a portion of an encoder for generating SNR scalability layers.

FIG. 8 illustrates a block diagram of a portion 800 of an encoder for generating SNR layers. More specifically, encoding portion 800 of the encoder comprises a plurality of stages $810_{1-n}$, where each stage assists in generating a SNR layer.

In operation, the wavelet coefficients of the input image of a particular spatial resolution (different spatial resolutions of the input image can be used) are quantized with the quantizer $Q_0$ 812. These quantized coefficients are scanned by ZTS module 814 using the above zerotree concept and then the significant maps and quantized coefficients are entropy coded by entropy (or arithmetic) coder 816 as discussed above. The output of the entropy coder 816 at this level, BS0, is the first portion of the bitstream, e.g., the first SNR layer.

Next, the quantized wavelet coefficients of the first layer are also reconstructed and subtracted from the original wavelet coefficients via inverse quantizer 818 and buffer 819. The "residual wavelet coefficients" are then fed into the second stage $810_2$ of the coder in which the wavelet coefficients are quantized with $Q_1$, and then zerotree scanned via ZTS module 824 and entropy coded via entropy coder 826. It should be noted that the residual wavelet coefficients may represent the error introduced by the quantization process. As such, subsequent outputs $BS_x$ can be perceived as "refinements" that can be used by the decoder to refine the reconstruction of the quantized wavelet coefficients. However, it should also be noted that changing the quantizer scale in the next stage may also introduce new wavelet coefficients that may not have existed at the above stage (e.g., these new wavelet coefficients were previously quantized to zeros). The quantization process of the present invention is further described below. The output of this second stage, BS1, is the second portion of the output bitstream, e.g., the additional information that when combined with the first SNR layer produces the second SNR layer.

The quantized coefficients of the second stage $810_2$ are also reconstructed and subtracted from the original coefficients, where the process is continued for the next stage and so on. As shown in FIG. 8, N+1 stages of the coder provides N+1 layers of SNR scalability. Each stage presents one layer of SNR. To obtain spatial (or both spatial and SNR) scalability, different spatial resolutions of the input image can be forwarded as input on path 805. For example, a plurality of different spatial resolutions of the input image can be processed by the first stage $810_1$ to generate a plurality of spatial scalability. In turn, if both spatial and SNR scalability is desired, each spatial resolutions of the input image can be processed by subsequent stages of the encoder portion 800. Thus, the MZTE method provides a very flexible framework to support the right tradeoff between layers and types of scalability, complexity and coding efficiency for any multimedia application.

Figure 9:
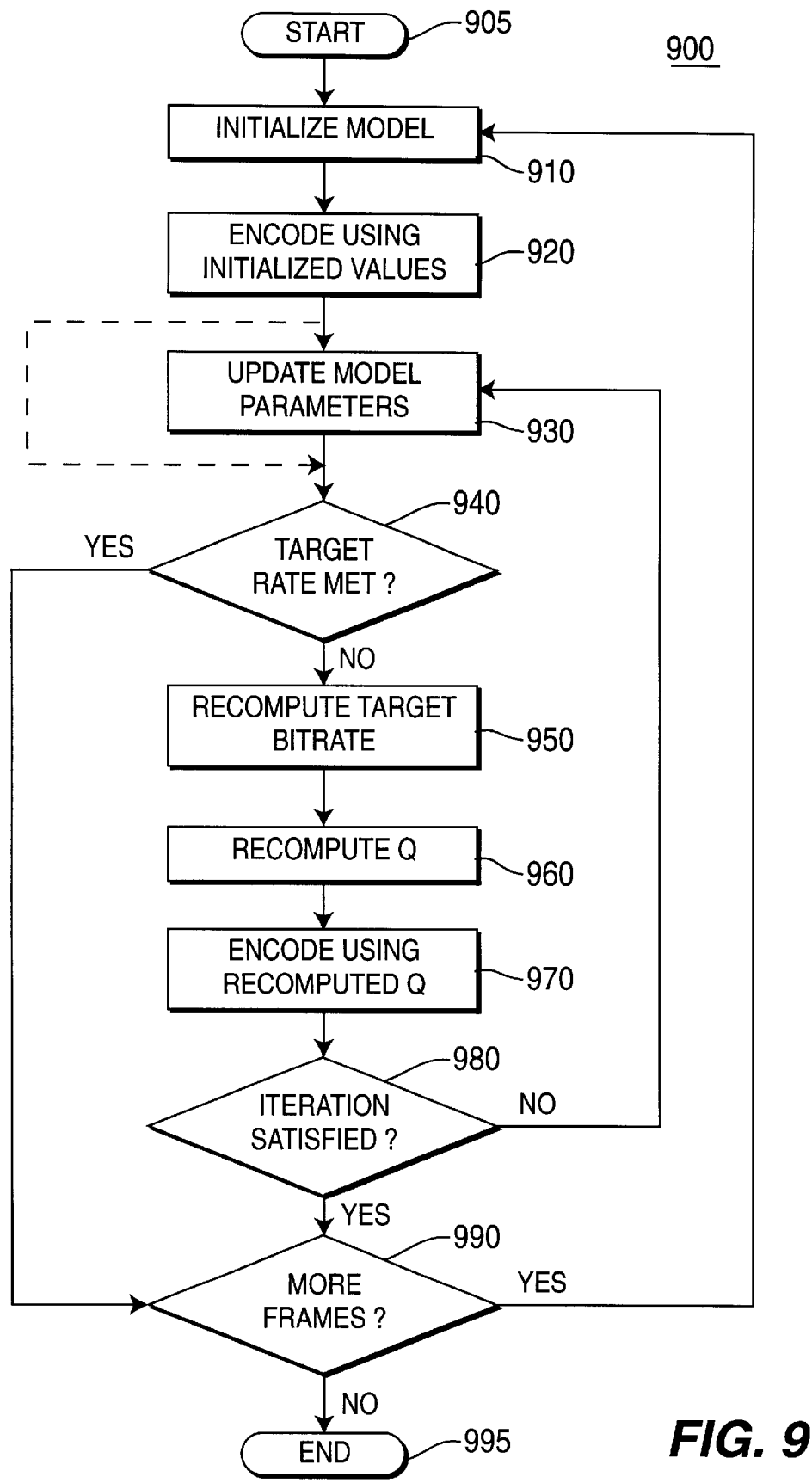
FIG. 9 illustrates a flowchart for deriving the optimal quantizer scale for each layer of a hierarchical subband coding system.

FIG. 9 illustrates a flowchart of a method 900 for deriving the optimal quantizer scale for each layer of a hierarchical subband coding system. It should be noted that a "subband layer" is defined broadly to include a spatial and/or quality layer of a hierarchically subband decomposed image. Although wavelet transform is used as an example of a particular type of subband decomposition, the present invention can be adapted to other subband decomposition transforms or methods.

Method 900 starts in step 905 and proceeds to step 910, where a rate distortion model is initialized. Specifically, method 900 employs a quadratic rate distortion model. The basic concept of the present invention is based on the strong correlation between the amplitudes of the hierarchical wavelet coefficients across several layers. In the Multiple-Quantization (MQ) mode of the current MPEG-4 Visual Texture Coding (VTC) tool, a different quantization scale can be applied to each individual wavelet spatial layer. The MQ provides more flexibility to improve the coding efficiency and perceptual image quality. The present technique can be extended to the other wavelet based still texture coding methods. Since the quantization scale is considered as a distortion measure, the quadratic rate distortion model for target bit-rate allocation can be described as $$\frac{R_i - H_i}{S_i} = \frac{A_1}{Q_i} + \frac{A_2}{(Q_i)^2} \quad (1)$$

where $R_i$, is the total number of bits used for encoding the current wavelet spatial layer i, $H_i$ is the bits used for header information, $S_i$ is the encoding complexity in terms of quantization errors per wavelet coefficient in a wavelet spatial layer i, $Q_i$ is the quantization scale used for the current wavelet spatial layer i, and $A_1$ and $A_2$ are the first order and the second order coefficients. In step 910, the model of equation (1) is initialized, e.g., the desired target bits are distributed to each wavelet layer equally or proportionately to energy distribution, e.g., the square of the wavelet coefficients. Alternatively, an identical quantization parameter can be applied for all resolution layers. Namely, initial $R_i$, $S_i$, and $Q_i$ are available via some preliminary computations and/or assumptions, e.g., use the same $S_i$ from a previous frame, divide a target frame rate evenly for the number of spatial layers i to obtain $R_i$ and the like.

In step 920, the initial or initialized values are used to encode the various subband layers of the decomposed image signal. For example, $Q_i$ is used to quantize a subband layer i, where a reasonable $Q_i$ can be a value of 15 for some applications.

In step 930, various model parameters of equation (1) can be updated based upon actual data resulting from encoding the image as discussed below. However, at the initial stage, there may not be sufficient data to begin updating the model parameters. Thus, step 930 can be skipped as shown by the dashed line.

In step 940, method 900 queries whether the target rate is met. In other words, method 900 queries whether the initialized values were appropriately selected, e.g., whether "actual $R_i$" (actual_bitrate) is within a tolerance range to the initialized $R_i$ (target_bitrate). Another way of viewing this query, is whether the sum of the $R_i$ for all the layers is within a tolerance range to the target bitrate for the entire frame. If the query is affirmatively answered, then method 900 proceeds to step 990. Namely, the initial values were adequate to meet the target bitrate calculated for the frame.

If the query is negatively answered, then method 900 proceeds to step 950. Namely, the initial values were not adequate to meet the target bitrate calculated for the frame and refinement is necessary.

In step 950, method 900 reallocate the target bitrate, i.e., a new $R_i$ is computed for each subband layer. Specifically, the target bitrate is computed based on the available bits. Since each layer has an individual statistic characteristic with correlation to its neighboring layers, the bitrate for each spatial layer is estimated based on its encoding complexity and a weighting factor W. The encoding complexity is computed in terms of mean square quantization error (MSE). The weighting factor depends on the target bitrate and the weighted interaction factor dependent on the number of subband or spatial layers and forward predicted MSE. It should be understood that although the present invention discloses the use of MSE as a measure of quantization error, other measures, e.g., sum of absolute difference (SAD) and the like can be adapted into the present invention.

The basic principle of the bit allocation is to minimize the overall quantization distortion subject to a total bit budget constraint. The Lagragian multiplier is one approach to obtain such an optimal allocation for image and video coding. However, a potential drawback is its higher complexity with possibly negative bitrate allocation, where a convergence method is then necessary to remove such potential problem. Thus, the present invention employs a heuristic and efficient bit technique for each subband layer (wavelet or resolution layer) based on the mean square error (MSE) introduced by the quantization process with its associated weighting factor. Namely, the mean square error (MSE) serves as the basis for determining the complexity $S_i$.

However, since each wavelet decomposition step doubles its dynamic range, the MSE in resolution layer i will be normalized as MSE(i) defined in the following equation by the wavelet layer to avoid such a doubling factor:

$$NMSE(i) = \left( \sum_j MSE(j) + (1 \ll (k - i - 1)) \right) \gg (k - i), \quad (2)$$

In this equation, the symbol k is the number of wavelet decomposition layers, the symbol j denotes a spatial location in resolution layer i and the symbols >> and << are right and left bit shifting operations, respectively. It should be noted that NMSE(i) is equivalent to $S_i$.

Next, a weighting factor is computed. The weighting factor is used to prioritize the importance among resolution layers and to predict the next MSE for faster convergence. Although the normalized MSE is a good indicator for bit allocation, the lack of accuracy in predicting the RD relations for the next iteration needs to be considered. The weighting factor is determined a priori by the MSE of the next iteration in each individual resolution layer. Note that the MSE of the next iteration is an actual MSE since the quantization process is performed in the wavelet domain. With this accurate MSE, the weighting factor can be used to forward predict and heuristically reduce the overall MSE. It is important to note that this factor is generated automatically based on the characteristics of source images, the bit allocation among layers can be adaptively adjusted. The weighting factor calculation and bitrate allocation among wavelet layers are presented as follows:

Weighting Factor Calculation

```
if (actual_bitrate > target_bitrate) {
    for (i=0; i<wvt_decomp_layers; i++) { /* resolution layer i */
        layer_MSE[i] = compute_MSE(i, current_QP+1);
        total_MSE = total_MSE + layer_MSE[i];}
    for (i=0; i<wvt_decomp_layers; i++) { /* resolution layer i */
        weight[i] = layer_MSE[i]/total_MSE;}           (3)
else {/* actual_bitrate < target_bitrate */
    for (i=0; i<wvt_decomp_layers; i++) { /* resolution layer i */
```

```
       layer_MSE[i] = compute_MSE(i, current_QP−1);
       total_MSE = total_MSE + layer_MSE[i];}
   for (i=0; i<wvt_decomp_layers; i++) { /* resolution layer i */
       weight[i] = layer_MSE[i]/total_MSE;
}
```

Target Bitrate Allocation

```
for (i=0; i<wvt_decomp_layers; i++) { /* resolution layer i */
   total_weightMSE = total_weightMSE + current_MSE[i] *
   weight[i];
}                                                              (4)
for (i=0; i<wvt_decomp_layers; i++) { /* resolution layer i */
R[i] target_bitrate * current_MSE[i] * weight[i]/total_weightMSE;
```

Using equation (4), a new target $R_i$ is calculated for each layer. It should be noted that "target_bitrate" is the target bitrate for the entire frame and "current_MSE[i]" represents the actual MSE resulting from the encoding process and that "layer_MSE[i]" represents a MSE for the next iteration of encoding based upon a change in the quantization scale for that layer i.

In step 960, method 900 computes a new quantization scale for each layer. Specifically, for each resolution layer i, a quantization step $Q_i$ is derived based on the model parameters $H_i$, $A_1$ and $A_2$ and the recalculated $S_i$ and $R_i$ in accordance with equations (2) and (4).

In step 970, method 900 employs the newly computed $Q_i$ to encode the various subband layers of the decomposed image signal.

In step 980, method 900 queries whether a threshold or a predefined number of refinement iterations has been achieved. Namely, the adjustment of the computed $Q_i$ can be stopped after a number of iterations depending on a specific application, e.g., the available computational cycles or the time constraint for encoding the image sequence. If the query is affirmatively answered, then method 900 proceeds to step 990. If the query is negatively answered, then method 900 proceeds to step 930, where another iteration of adjustment is performed.

In step 990, method 900 queries whether additional frames are to be encoded. If the query is affirmatively answered, then method 900 proceeds to step 910, where the entire process is performed again for another frame of the image sequence. If the query is negatively answered, then method 900 ends in step 995.

As discussed above, the parameters of the quadratic rate distortion model of equation (1) can be updated in step 930 of FIG. 9. Specifically, the rate distortion model is updated based on the encoding results of the current iteration. The bits used for the header are deducted since it is not related to $Q_i$. The model parameters $A_1$ and $A_2$ are updated as follows. Given the number of texture bits, $R_i$, the quantization level, $Q_i$, and the encoding complexity, $S_i$, for the current and a specified number of past iterations, the model parameters $A_1$ and $A_2$ can be calculated using a linear regression technique. To obtain a more accurate R-D model for each resolution layer, additional statistical methods described below are performed:

1. Selection of Data Points:
   The quality and quantity of the data set play very important roles in the accuracy of the model. As for the quantity of the data set, the more data points selected will make it more likely to result in an accurate model but with higher complexities. As for the quality of the data set, several objective indices such as MSE of the current data point can be used. By considering all these factors, a sliding window based data selection mechanism is developed.

2. Calculation of the Model Parameters $A_1$ and $A_2$:
   Based on these two values, the theoretical target bitrate can be calculated for each data point within the sliding window obtained in step 1. For the selected data points, the quantization levels and the actual bitrates at previous time instants are collected by the encoder. Using the linear regression technique, the two model parameters $A_2$ and $A_1$ can be obtained as shown below.

$$A_2 = \frac{n\sum_{i=1}^{n} R_i - \left(\sum_{i=1}^{n} Q_i^{-1}\right)\left(\sum_{i=1}^{n} Q_i R_i\right)}{n\sum Q_i^{-2} - \left(\sum_{i=1}^{n} Q_i^{-1}\right)^2} \quad (5)$$

$$A_1 = \frac{\sum_{i=1}^{n} Q_i R_i - A_2 Q_i^{-1}}{n} \quad (6)$$

where n is the number of selected past iterations, $Q_i$ and $R_i$ are the actual average quantization levels and actual bit counts in the past, respectively.

Removal of the Outliers from the Data Set:
   After the new model parameters $A_1$ and $A_2$ are derived, the encoder optionally performs the refinement step to remove some statistical outlier data points. The removal of the outliers from the data set can diminish the impact of abnormal data points in the model update process. The outliers are defined in the statistical sense, as those data points whose difference between the actual bitrate and the target bitrate is larger than k standard deviation (e.g., k=1 as applied in experiments). The actual bitrate for each past frame is known and the target bitrate is recomputed based on the new model parameters obtained in the previous step, the actual bitrate $R_i$ and the average quantization level $Q_i$. By applying the concept of this statistical technique, more representative data points are selected, and the final model parameters can be derived based on these new data points. Note that, to avoid the removal of all data points, the latest data point is always selected in the data set.

Figure 10:
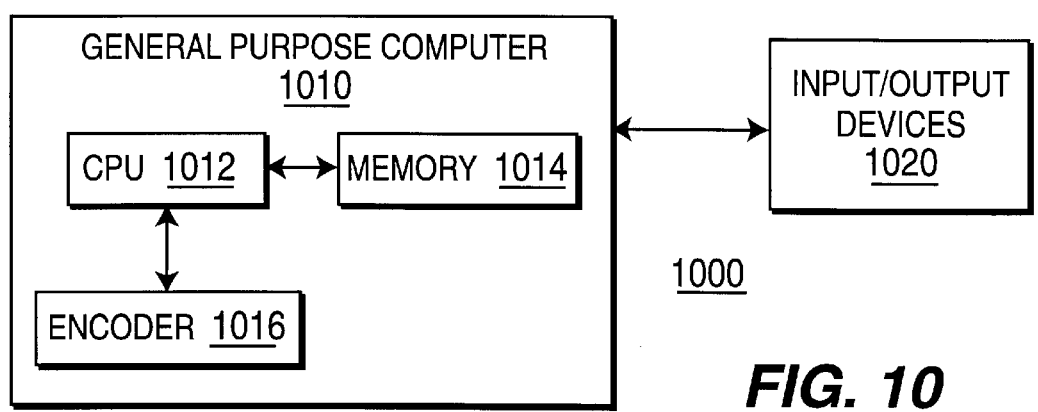
FIG. 10 illustrates an encoding system of the present invention.

FIG. 10 illustrates an encoding system 1000 of the present invention. The encoding system comprises a general purpose computer 1010 and various input/output devices 1020. The general purpose computer comprises a central processing unit (CPU) 1012, a memory 1014 and an encoder 1016 for receiving and encoding a sequence of images.

In the preferred embodiment, the encoder 1016 is simply the encoder system 100 and/or encoder 106 as discussed above. The encoder 1016 can be a physical device which is coupled to the CPU 1012 through a communication channel. Alternatively, the encoder 1016 can be represented by a software application which is loaded from a storage device and resides in the memory 1012 of the computer. As such, the encoder 100 and 106 of the present invention can be stored on a computer readable medium.

The computer 1010 can be coupled to a plurality of input and output devices 1020, such as a keyboard, a mouse, a camera, a camcorder, a video monitor, any number of imaging devices or storage devices, including but not limited to, a tape drive, a floppy drive, a hard disk drive or a compact disk drive. The input devices serve to provide inputs to the computer for producing the encoded video bitstreams or to receive the sequence of video images from a storage device or an imaging device.

Although various embodiments which incorporate the teachings of the present invention have been shown and described in detail herein, those skilled in the art can readily devise many other varied embodiments that still incorporate these teachings.

What is claimed is:

1. Method for encoding an input image into a bitstream, said method comprising the steps of:

(a) generating a subband tree for the input image, where said subband tree has a plurality of subband layers of coefficients;

(b) quantizing said plurality of layers of coefficients with a plurality of quantizer scales, where each quantizer scale corresponds to a layer of said subband tree;

(c) recursively adjusting at least one of said plurality of quantizer scales in accordance with a quantization error that is computed from at least two of said plurality of subband layers; and (d) encoding said quantized coefficients.

2. The method of claim 1, wherein said quantization error of adjusting step (c) is computed in accordance with a measure of mean square quantization error.

3. The method of claim 1, wherein said subband tree is a wavelet tree.

4. The method of claim 3, wherein said quantizing step b) comprises the steps of:

(b1) computing a target bitrate for each of said plurality of subband layers by using a polynomial model; and (b2) quantizing coefficients from each of said plurality of subband layers in accordance with said computed target bitrate for each of said plurality of subband layers.

5. The method of claim 4, wherein said polynomial model is expressed as:

$$\frac{R_i - H_i}{S_i} = \frac{A_1}{Q_i} + \frac{A_2}{(Q_i)^2}$$

where $R_i$ is a target bitrate for encoding a subband layer i, $H_i$ is a number of bits for encoding header information, $S_i$ is a measure of said quantization error in a subband layer i, $Q_i$ is a quantization scale for a subband layer i, and $A_1$ and $A_2$ are first order and second order coefficients.

6. The method of claim 3, wherein said adjusting step c) comprises the step of:

(c1) computing said quantization error in accordance with a normalized mean square quantization error.

7. The method of claim 6, wherein said normalized mean square quantization error is expressed as:

$$NMSE(i) = \left( \sum_j MSE(j) + (1 \ll (k - i - 1)) \right) \gg (k - i),$$

where NMSE(i) is said normalized mean square quantization error for a subband layer i, k is a number of said subband layers, j denotes a spatial location in said subband layer i and symbols >> and << are right and left bit shifting operations, respectively.

8. The method of claim 6, wherein said adjusting step c) further comprises the step of:

(c2) computing a new target bitrate for at least one of said plurality of subband layers in accordance with a weighting factor that accounts for quantization error changes in a next iteration of coding.

9. The method of claim 8, wherein said encoding step (d) encodes said quantized coefficients in accordance with said new target bitrate.

10. The method of claim 8, wherein said weighting factor is expressed as:

```
if (actual_bitrate > target_bitrate)
   layer_MSE[i] = compute_MSE(i, current_QP+1);
   total_MSE = total_MSE + layer_MSE[i];
   weight[i] = layer_MSE[i]/total_MSE;}
else (actual_bitrate < target_bitrate)
   layer_MSE[i] = compute_MSE(i, current_QP-1);
   total_MSE = total_MSE + layer_MSE[i];
   weight[i] = layer_MSE[i]/total_MSE;
``` where actual_bitrate is a bitrate resulting from actual encoding, target_bitrate is a target bitrate, layer_MSE[i] is a mean square quantization error for a subband layer i, current_QP is a current quantization scale, total_MSE is a sum of said mean square quantization errors for all of said plurality of subband layers, and weight[i] is said weighting factor for a subband layer i.

11. The method of claim 8, wherein said new target bitrate is expressed as:

```
total_weightMSE = total_weightMSE + current_MSE[i] * weight[i]
R[i] = target_bitrate * current_MSE[i] * weight[i]/total_weightMSE
``` where R[i] is said new target bitrate for a subband layer i, target_bitrate is a target bitrate for a current frame, current_MSE[i] is a current mean square quantization error for a subband layer i, weight[i] is said weighting factor for a subband layer i.

12. The method of claim 4, wherein parameters of said polynomial model are updated using actual encoding results.

13. The method of claim 1, wherein said encoding step (d) encodes said quantized coefficients in accordance with multiscale zerotree entropy encoding (MZTE).

14. Apparatus for encoding an input image into a bitstream, said apparatus comprising:

a subband tree generator for generating a subband tree for the input image, where said subband tree has a plurality of subband layers of coefficients;

a quantizer, coupled to said subband tree generator, for quantizing said plurality of layers of coefficients with a plurality of quantizer scales, where each quantizer scale corresponds to a layer of said subband tree;

a rate controller, coupled to said quantizer, for recursively adjusting at least one of said plurality of quantizer scales in accordance with a quantization error that is computed from at least two of said plurality of subband layers; and an encoder, coupled to said quantizer, for encoding said quantized coefficients.

15. The apparatus of claim 14, wherein said quantizer computes said quantization error in accordance with a measure of mean square quantization error.

16. The apparatus of claim 14, wherein said rate controller computes a target bitrate for each of said plurality of subband layers by using a polynomial model, and said quantizer quantizes coefficients from each of said plurality of subband layers in accordance with said computed target bitrate for each of said plurality of subband layers.

17. The apparatus of claim 16, wherein said rate controller further computes a new target bitrate for at least one of said plurality of subband layers in accordance with a weighting factor that accounts for quantization error changes in a next iteration of coding.

18. The apparatus of claim 14, further comprising a symbol assignor, coupled to said encoder, that assigns symbols to said quantized coefficients in accordance with multiscale zerotree entropy encoding (MZTE).

19. A computer-readable medium having stored thereon a plurality of instructions, the plurality of instructions including instructions which, when executed by a processor, cause the processor to perform the steps comprising of:

(a) generating a subband tree for the input image, where said subband tree has a plurality of subband layers of coefficients;

(b) quantizing said plurality of layers of coefficients with a plurality of quantizer scales, where each quantizer scale corresponds to a layer of said subband tree;

(c) recursively adjusting at least one of said plurality of quantizer scales in accordance with a quantization error that is computed from at least two of said plurality of subband layers; and (d) encoding said quantized coefficients.

20. An encoding system comprising:

a motion compensator for generating a predicted image of a current input frame;

a subband coder, coupled to said motion compensator, for applying a subband decomposition to a difference signal between the input frame and said predicted image, where said decomposition produces a subband tree having a plurality of subband layers of coefficients, and for quantizing said plurality of layers of coefficients with a plurality of quantizer scales, where each quantizer scale corresponds to a layer of said subband tree; and a rate controller, coupled to said subband coder, for recursively adjusting at least one of said plurality of quantizer scales in accordance with a quantization error that is computed from at least two of said plurality of subband layers.

* * * * *